United States Patent [19]

Held et al.

[11] Patent Number: 4,946,659

[45] Date of Patent: Aug. 7, 1990

[54] PROCESS FOR THE REDUCTION OF THE NITROGEN OXIDES IN EXHAUST GASES USING A ZEOLITE-CONTAINING CATALYST

[75] Inventors: Wolfgang Held; Axel König, both of Wolfsburg; Lothar Puppe, Burscheid, all of Fed. Rep. of Germany

[73] Assignee: Bayer Aktiengesellschaft, Leverkusen-Bayerwerk, Fed. Rep. of Germany

[21] Appl. No.: 395,985

[22] Filed: Aug. 21, 1989

[30] Foreign Application Priority Data

Sep. 3, 1988 [DE] Fed. Rep. of Germany ....... 3830045

[51] Int. Cl.$^5$ .......................... B01D 47/00; B01J 8/00; C01B 21/00
[52] U.S. Cl. .................................... 423/212; 423/239
[58] Field of Search .............. 423/235, 235 D, 239 A, 423/239, 212, 212 C

[56] References Cited

U.S. PATENT DOCUMENTS

| | | | |
|---|---|---|---|
| 3,801,696 | 4/1974 | Mark | 423/212 |
| 3,826,810 | 7/1974 | Lawson | 423/212 |
| 4,104,361 | 8/1978 | Nishikawa et al. | 423/239 |
| 4,119,702 | 10/1978 | Azuhata et al. | 423/235 |
| 4,154,803 | 5/1979 | Uchikawa et al. | 423/239 |
| 4,155,986 | 5/1979 | Gladden | 423/239 |
| 4,473,535 | 9/1984 | Kittrell et al. | 423/239 |

FOREIGN PATENT DOCUMENTS

| | | |
|---|---|---|
| 2542204 | 4/1976 | Fed. Rep. of Germany. |
| 3001457 | 7/1981 | Fed. Rep. of Germany. |
| 3704030 | 8/1988 | Fed. Rep. of Germany. |
| 3802871 | 8/1988 | Fed. Rep. of Germany. |

Primary Examiner—Gregory A. Heller
Attorney, Agent, or Firm—Connolly and Hutz

[57] ABSTRACT

An improvement in the removal of nitrogen oxides from the exhaust gases of internal combustion engines is achieved by adding urea or a urea-containing reducing agent to the exhaust gases and contacting the gases under oxidizing conditions with a zeolite containing catalyst.

6 Claims, 1 Drawing Sheet

PROCESS FOR THE REDUCTION OF THE NITROGEN OXIDES IN EXHAUST GASES USING A ZEOLITE-CONTAINING CATALYST

This invention relates to a process according to which improved removal of nitrogen oxides from exhaust gases of internal combustion engines is achieved.

BACKGROUND OF THE INVENTION

A process for removing nitrogen oxides from exhaust gases using a zeolite catalyst and a device for carrying out this process are known from DE-OS 3 642 018. As stated in detail therein, the zeolite catalyst, which may be in the form of a monolithic catalyst or loose-material catalyst, may preferably contain zeolites of the X and Y type or mordonite type. In this known process, the nitrogen oxides present in the exhaust gases of, for example, the internal combustion engine of a motor vehicle are reacted with the hydrocarbons also normally present in the exhaust gases as reducing agent and with the oxygen present during combustion of a lean fuel/air mixture. There is thus no need for the known addition of ammonia as reducing agent which is problematical for various reasons, particularly in motor vehicles.

Accordingly, the described effect of the known process presupposes a certain minimum concentration of hydrocarbons in the exhaust because, as described, they act as reducing agents. Accordingly, the known process cannot be optimally used at least in those cases where, as in diesel engines, the concentration of hydrocarbons in the exhaust gas is distinctly lower than the concentration of nitrogen oxides.

BRIEF DESCRIPTION OF THE INVENTION

The object of the present invention is to provide a process improvement for reducing nitrogen oxides from exhaust gases which, without any need to add and, hence, store problematical reducing agents, such as ammonia, may also be used for the reduction of nitrogen oxides in exhaust gases in which the concentration of hydrocarbons is distinctly lower than the concentration of nitrogen oxides.

According to the invention, the solution to this problem lies in the feature of the use of urea or a urea-containing compound for reducing nitrogen oxides in exhaust gases in the presence of a zeolite-containing catalyst.

Advantageous embodiments of the invention are described in the following.

DETAILED DESCRIPTION

Figure 1:
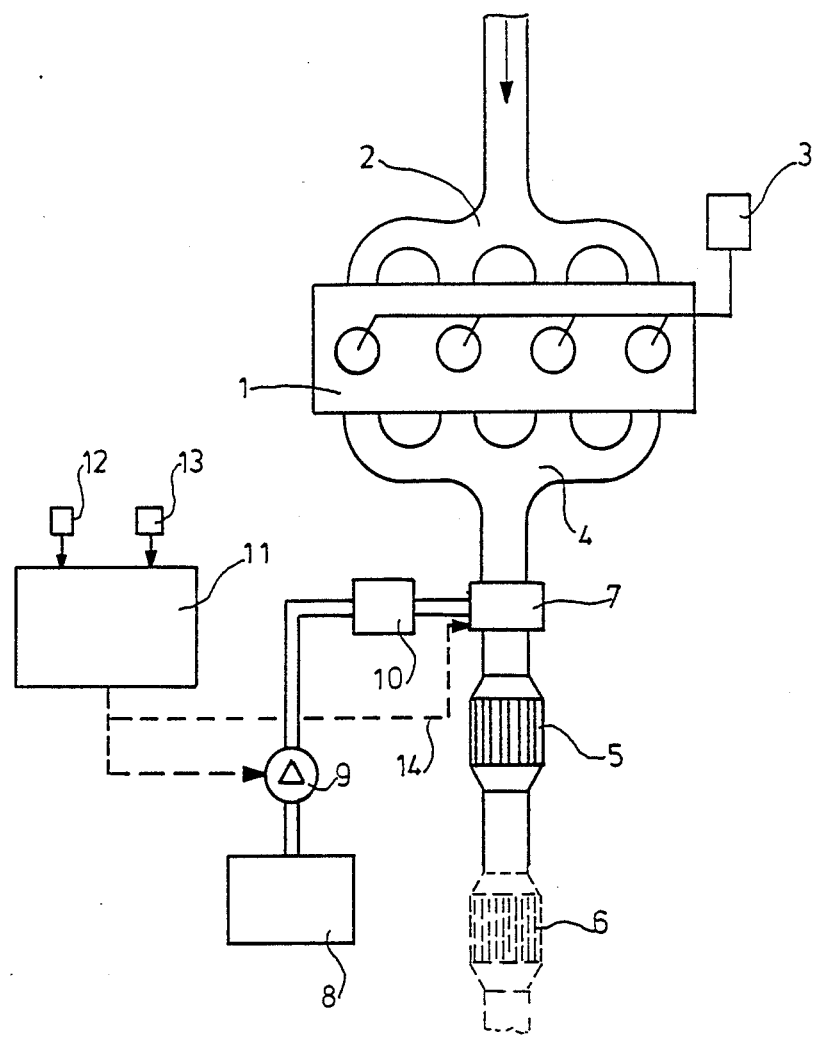
FIG. 1 illustrates an apparatus suitable for carrying out the process of this invention.

This is attributable to the fact that urea ($H_2N-CO-NH_2$) readily hydrolyzes to $CO_2$ and $2NH_3$. In the final analysis, therefore, urea is a store of ammonia. Although, for example for treating the exhaust gases emitted from the internal combustion engine of a motor vehicle, the reducing agent has to be carried in a tank on board the vehicle, it is conveniently present in the form of an aqueous urea solution and the ammonia is not formed until later.

The reducing agent may be metered stoichiometrically, substoichiometrically or overstoichiometrically. The following $NO_x$ reduction for example was achieved with urea on a Cu-exchanged zeolite of the ZSM type:

| $NO_x$:urea | 1:0.25 | 1:0.41 | 0.52 | 1:0.83 |
|---|---|---|---|---|
| $NO_x$ conversion % | 50% | 74% | 83% | 99% |

Accordingly, the addition of reducing agent will be controlled or regulated in dependence upon the mode of operation or operating parameters of the machine generating the exhaust gas, i.e. for example an internal combustion engine. In the case of an internal combustion engine of a motor vehicle for example, a certain concentration of nitrogen oxides is established in the exhaust gas in operation in dependence on the particular point of operation of the engine, which is defined for example by rotational speed and load, the addition of reducing agent being controlled or regulated in such a way that the exhaust gas contains negligble amounts of reducing agent and nitrogen oxides after the zeolitic catalyst in the direction of flow.

The invention is described in more detail hereinafter with reference to the accompanying drawing which illustrates one example of embodiment of a device for carrying out the process according to the invention in the internal combustion engine of a motor vehicle In the illustrated embodiment, the internal combustion engine is a diesel engine 1 with an intake manifold 2, a fuel supply 3 and an exhaust system 4. From the exhaust system, the exhaust gases pass to the zeolitic catalyst 5 which may have a structure known in detail from DE-OS 36 42 018 previously cited, or a corresponding composition, passing from the zeolitic catalyst 5 into the oxidation catalyst 6, which may even be left out.

The zeolitic catalyst 5 is preceded in the direction of flow by the feeder 7 for a reducing agent containing or consisting entirely of urea. The reducing agent is stored in liquid form in the tank 8 and, after decomposition by means of the heating unit 1? which is only active in the event of cold starting, is pumped into the feeder 7 by the pump 9. The composition of the heating unit 10 is known per se. For example, it may comprise a spark plug or an electrically heated hedgehog as its essential components. When the engine is hot, the urea is decomposed by the hot exhaust gas.

The output of the pump 9 is controlled or regulated in such a way that the quantity of reducing agent required for reducing the particular quantity of nitrogen oxide in the exhaust gas is fed to the exhaust gas at 7. The content of nitrogen oxides in the exhaust gas depends upon the particular mode of operation of the internal combustion engine 1, the particular point of operation being definable by the particular speed and load values of the engine 1. Accordingly, the output of the pump 9 may be controlled or regulated from a characteristic-curve memory 11 to which signals of a speed sensor 12 and a load sensor 13 of the engine 1 can be fed and in which values for the nitrogen oxide content of the exhaust gas of the engine 1 corresponding to the various speed and load values are stored. The memory 11 then supplies control signals corresponding to the particular nitrogen oxide content to the pump 9.

As indicated by the line 14, the feeder 7, for example in the form of an electromagnetic injection valve, may be correspondingly controlled instead of the pump.

Accordingly, the present invention enables the nitrogen oxides in exhaust gases to be reduced on a zeolite-containing catalyst, even for low concentrations of hydrocarbons in the exhaust gases, without any need to use problematical reducing agents.

What is claimed is:

1. In an improved process for reducing nitrogen oxides in internal combustion engine exhaust gases by contacting the gases under oxidizing conditions with a zeolite-containing catalyst in the presence of a reducing agent in the exhaust gas, the improvement comprises said reducing agent being urea or a urea-containing substance.

2. A process as claimed in claim 1 wherein the reducing agent is heated to the decomposition temperature of the urea before it is added to the gases.

3. A process as claimed in claim 1 wherein the catalyst has the catalytic properties of a Cu-exchanged zeolite.

4. A process as claimed in claim 2 wherein the quantity of reducing agent added is adJusted and regulated in dependence on the operating parameters of the engine producing the exhaust gas.

5. A process as claimed in claim 4 wherein the operating parameters of the engine are rotational speed and engine load.

6. A process as claimed in claim 4 wherein the quantity of reducing agent added is regulated by means of a characteristic-curve memory comparison for the nitrogen oxide content of the exhaust gases for various values of the operating parameters such that the reducing agent is constantly added in substantially the quantity required for complete reduction of the nitrogen oxides.

* * * * *